US008046349B2

(12) United States Patent
Nurmi

(10) Patent No.: US 8,046,349 B2
(45) Date of Patent: Oct. 25, 2011

(54) METHOD, A SYSTEM, A DEVICE, AND A COMPUTER PROGRAM PRODUCT FOR PROVIDING INFORMATION REGARDING THE VALIDITY OF A CHARACTER STRING AS A DOCUMENT IDENTIFIER

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 446 days.

(21) Appl. No.: 11/272,438

(22) Filed: Nov. 9, 2005

(65) Prior Publication Data
US 2007/0106665 A1    May 10, 2007

(51) Int. Cl.
*G06F 7/00* (2006.01)
*G06F 17/30* (2006.01)
(52) U.S. Cl. .................................................... 707/709
(58) Field of Classification Search .............. 707/3, 709, 707/999.03
See application file for complete search history.

(56) References Cited

U.S. PATENT DOCUMENTS

| 5,907,680 | A  | * | 5/1999  | Nielsen ........................ 709/228 |
| 6,041,324 | A  |   | 3/2000  | Earl et al. |
| 6,332,158 | B1 | * | 12/2001 | Risley et al. .................. 709/219 |
| 6,564,213 | B1 | * | 5/2003  | Ortega et al. ..................... 707/5 |
| 6,615,237 | B1 | * | 9/2003  | Kyne et al. .................... 709/203 |
| 6,897,867 | B2 | * | 5/2005  | Katayama ...................... 345/440 |
| 2003/0014450 | A1 | * | 1/2003 | Hoffman ........................ 707/533 |
| 2004/0019697 | A1 | * | 1/2004 | Rose ............................. 709/245 |
| 2004/0254928 | A1 | * | 12/2004 | Vronay et al. ..................... 707/5 |
| 2005/0235031 | A1 | * | 10/2005 | Schneider et al. ............ 709/203 |
| 2005/0283468 | A1 | * | 12/2005 | Kamvar et al. ................... 707/3 |
| 2006/0112066 | A1 | * | 5/2006  | Hamzy ............................. 707/1 |

* cited by examiner

*Primary Examiner* — Cam Truong
(74) *Attorney, Agent, or Firm* — Alston & Bird LLP

(57) ABSTRACT

This invention relates to a method, a system, a device, a browser and a computer program product for informing on the validity of a character string as a document identifier. In the method, a character string comprising one or more characters is received, the validity of the character string as a document identifier is checked repeatedly, a valid part of the character string is indicated, by means of which the document identifier is defined, and a user is offered a possibility to send a request for a document relating to the document identifier defined by the valid part of the character string.

22 Claims, 4 Drawing Sheets

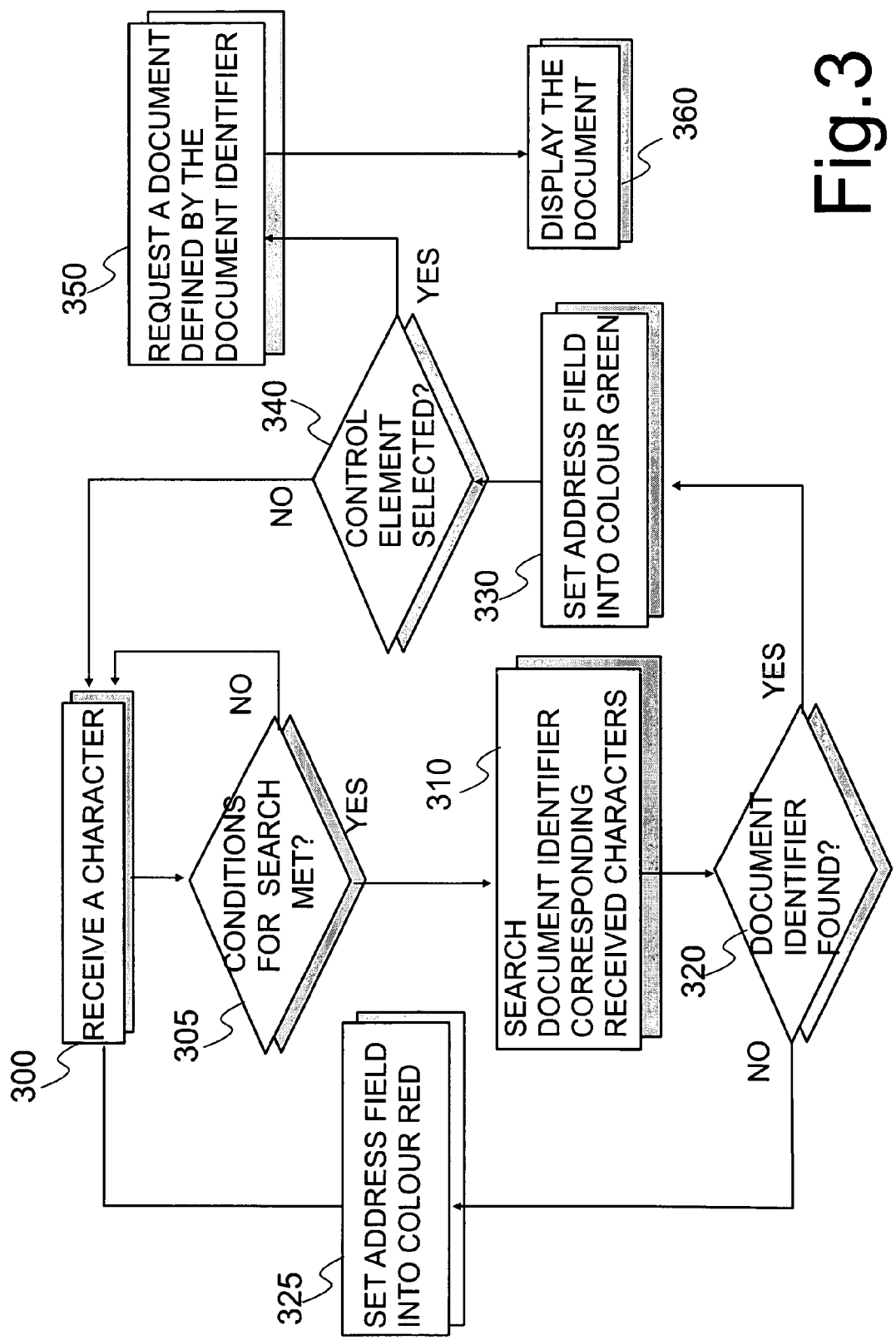

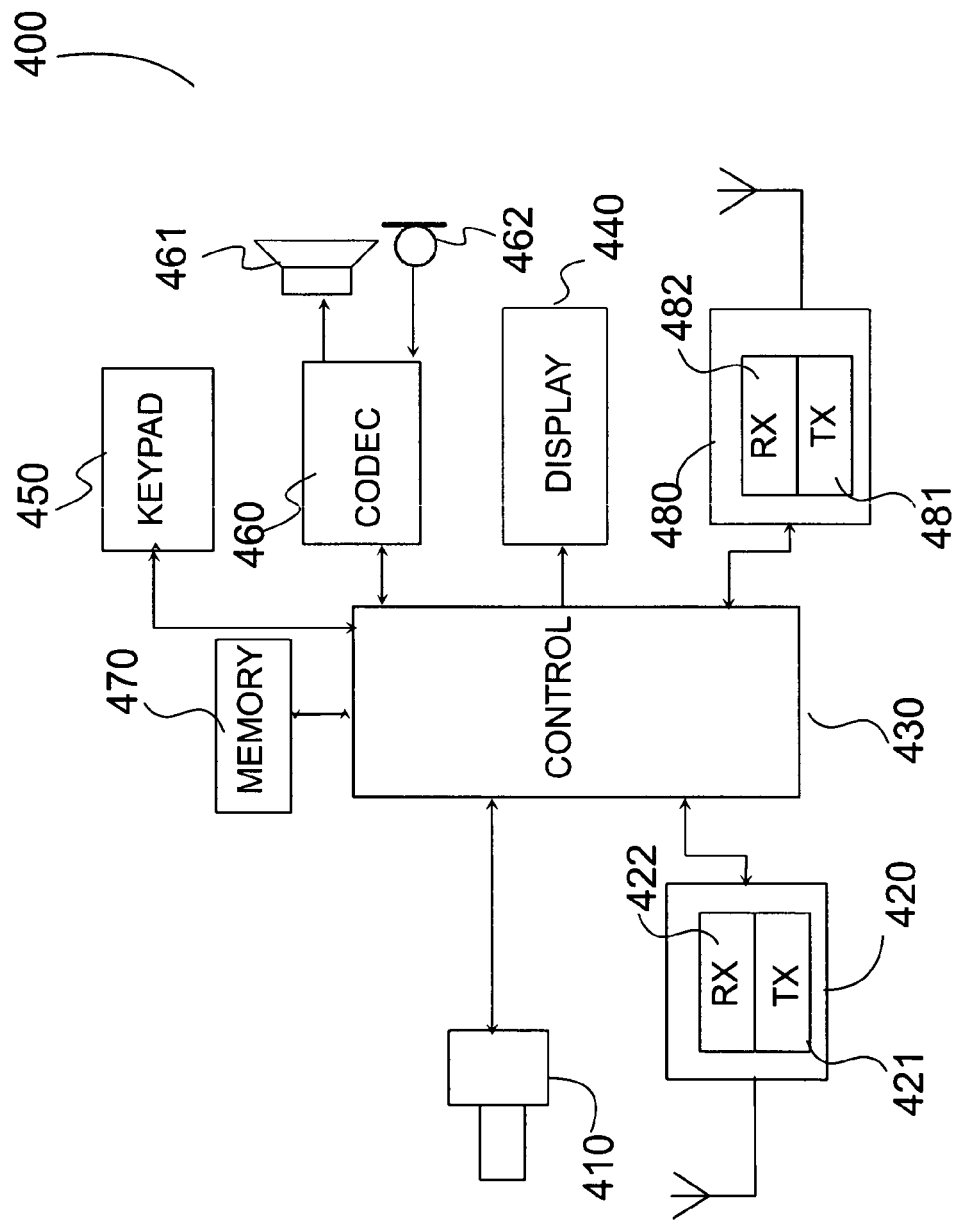

US 8,046,349 B2

METHOD, A SYSTEM, A DEVICE, AND A COMPUTER PROGRAM PRODUCT FOR PROVIDING INFORMATION REGARDING THE VALIDITY OF A CHARACTER STRING AS A DOCUMENT IDENTIFIER

FIELD OF THE INVENTION

This invention relates to a solution for informing on the validity of a character string as a document identifier.

BACKGROUND OF THE INVENTION

The Internet is a global network that is formed for computers, so called client computers and server computers ("a client" and "a server"). In order to browse data in the internet, the client makes a contact to the server which stores the data being presented in the internet. The client asks data from the server by means of a web browser ("browser"), which is a software program intended for browsing.

The request for the data is done by a user desiring to go on a certain web page. The user opens the browser, of which address field the user either types an address (e.g. URL, Uniform Resource Locator) or selects a link directing to the desired web page. The request including the desired address is sent to a server, which searches the requested web page and returns it to the client, if the web page is stored in said server. However, there are times, when a web page is not found from the server, whereby the response to the client comprises information that the desired address does not refer to any existing document. This might have been a result of a mistyped address or a misrepresented link or if the document is removed or saved to some other location. In any case, the user does not know what went wrong.

Relating to this problem, a publication U.S. Pat. No. 6,041,324 has presented a solution for determining a valid path for a web page address. In said solution an address path for the web page is transmitted to a server, which server returns an indication of a not found page, if the address does not refer to any existing document. As a result of this, the address is truncated by the most specific portion from the end of the address path, which truncated address is again transmitted to the server in order to have a corresponding web page. This operation is iterated between the client and the server until the address has been truncated to such a form, which is valid and by means of which a web page is found. When a valid path for the address is found the user can be given an option to ask completion portions to the path, i.e. subpages. If the completion portions are asked and if there exists any, they are displayed to the user, which can select one for to be added to the address path.

It can be realised that the solution presented in publication U.S. Pat. No. 6,041,324, suits well to a situation, where the user has e.g. mistyped a portion of the address, but where at least another portion of the address still refers to an existing web page. However, the searching process is slow because of the iteration process carried out in the publication.

Therefore a solution for further improving the user experience with browsing is needed, and the current invention is targeted to such a need.

SUMMARY OF THE INVENTION

The aim of the current invention is to a provide a method, a system, a device, a browser, a computer program product for indicating the validity of a character string as a document identifier before loading the web page from a server.

The method comprises steps for receiving a character string comprising one or more characters, repeatedly checking the validity of said character string as a document identifier, indicating a valid part of said character string, and offering a user a possibility to send a request for a document relating to the document identifier defined by the valid part of the character string.

The system is capable of receiving a character string, said character string comprising one or more characters, and checking repeatedly the validity of said character string as a document identifier, the system is further capable of indicating a valid part of said character string, and said system is further capable of offering a user a possibility to send a request for a document relating to the document identifier defined by the valid part of the character string.

The device comprises input means for receiving a character string comprising one or more characters, said device is capable of repeatedly checking the validity of said character string as a document identifier, and further, of indicating a valid part of said character string, said device further is capable of offering a user a possibility to send a request for a document relating to the document identifier defined by valid part of the character string.

The browser comprises at least an address field for receiving a character string, and means for repeatedly checking the validity of said character string as a document identifier, said browser being capable of indicating a valid part of said character string, said browser further being capable of offering a user a possibility to send a request for a document relating to the document identifier defined by the valid part of the character string.

The computer program product comprises code means stored on a readable medium, adapted, when run on a computer, at least to receive a character string comprising one or more characters, to repeatedly check the validity of said character string as a document identifier, to indicate a valid part of said character string, and to offer a user a possibility to send a request for a document relating to the document identifier defined by the valid part of the character string.

In the current invention, the validity of the document, e.g. an electronic document, is determined by the validity of the document identifier. The document identifier ranges from a least specific part to a most specific part, which the least specific part may relate to a domain part in a URL address.

The purpose of the current invention is to enable a situation, where the user is aware of the validity of the address he/she is typing while he/she is typing the address. The invention enables also checking of such an address, which is provided by e.g. a link. Therefore there is not a need for loading the electronic document in order to get information on whether the document exists or not. A term "character string" relates to a input received by an application. The purpose of the character string is to function as an address for an electronic document, but—the motivation for the current solution—the character string may also be invalid to be used as an address. Electronic document can be e.g. a web page, a file in the Internet, a file in the user's computer, or similar. In the current solution the application, for example a browser, receives the character string from a user, who types it, or via a link being selected by the user.

By means of the current invention the usability of browsing is improved significantly. In addition the accuracy of addresses is improved, whereby the address may be used for fetching correct electronic documents by means of any applications. This is possible by means of a searching function according to the invention, where the character string received is checked before transmitting it to the server. Ideally, the validity of a portion of the character string being typed is determined at the time the user is typing the character string or, alternatively, checking the validity can be triggered on a basis of a specific character, for example.

DESCRIPTION OF THE DRAWINGS

The current invention is described in more detailed manner by means of the attached drawings and the description, which follows. In the drawings

FIG. 3 illustrates an example of the current invention as a flow chart, and

FIG. 4 illustrates an example of a device according to the invention.

DETAILED DESCRIPTION OF THE INVENTION

Figure 1:
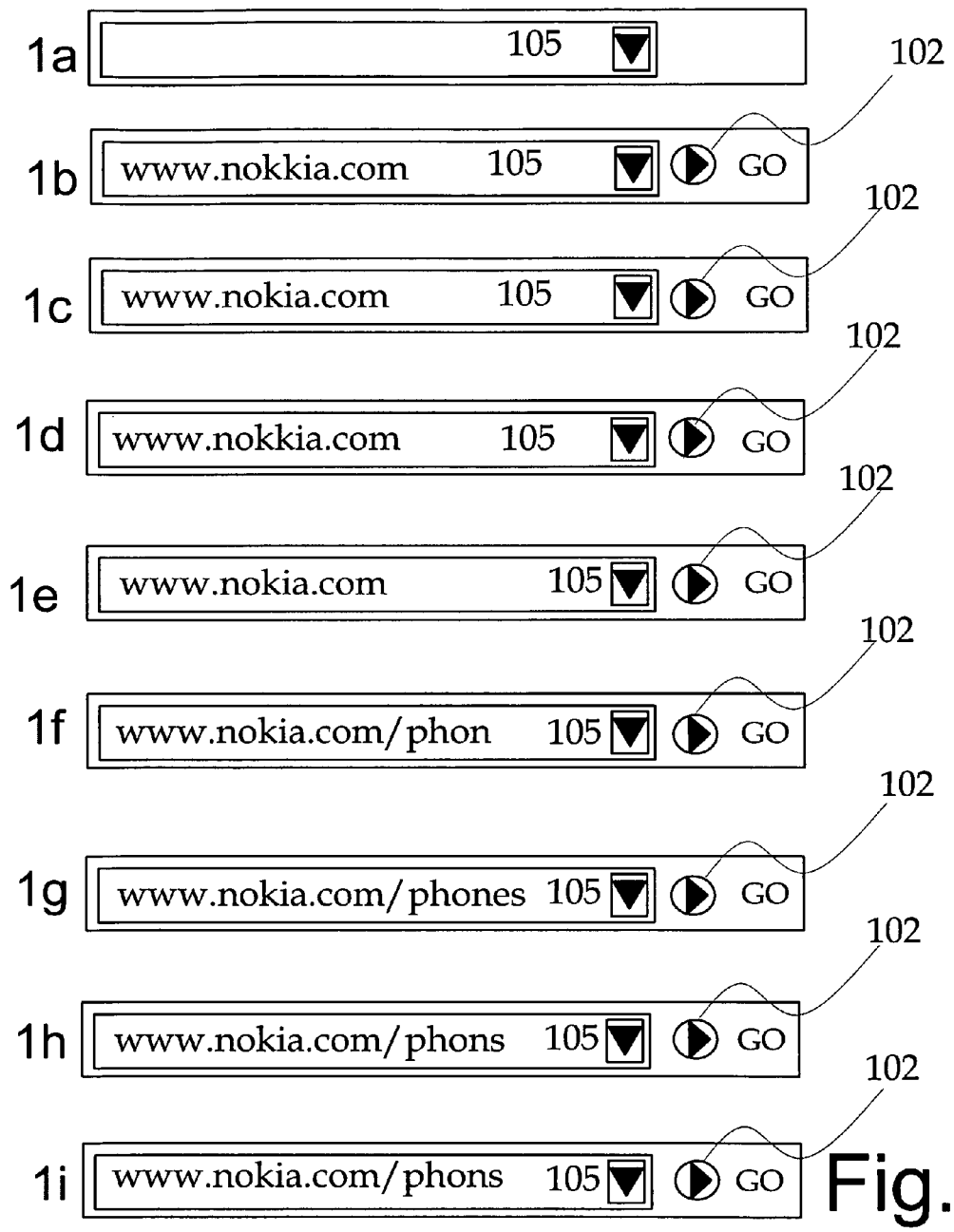
FIGS. 1a-i illustrate examples of a browser's address field.

In the following the current invention is described with help of examples. But before going into the examples, the general idea of the solution is described at first.

Generally, when a user wishes to open a web page stored in a server, the user has to input an address for the desired web page. A character string, which refers to a location of the desired web page, is input to an address field in an application. The application in the following examples is a browser, but it should be noticed that the application can also be an email application or some other application, where an address for an electronic document may occur, whereby the accuracy of such an address can be solved by the current invention. At the time the user starts typing the character string in the current invention, the browser may supply the character string being typed by that time and possibly relating to a portion of the address—not necessarily to a whole address—to a search engine, which starts searching the desired web page from the network by means of the supplied character string. As an alternative to the search engine, the browser itself may try to form a connection to the desired web page, which is pointed in the address field. Both methods make the search in order to determine whether the web page that is requested by the character string, exists in the internet or not. In other words the methods determine the validity of the address in question. The user may modify conditions for the search, such as how often the searching is to be done for one address. For example, the user may define that a new search should be started every time when "/" sign is typed, or that the search should operate constantly during the typing, or that the search should be done after the typing is finished or paused. In addition the user may define that the search should be done only for the basic address, i.e. that portion of the address, which specifies a domain. In a situation, where for example an email application is used, the user—while writing the email message— writes e.g. "www.nokki" to the message field. In the message field (which identifies the address by means of the format of the address) the validity of the address can be indicated in a similar way than when the address is typed to a browser. If colour indication was used, then the validity of a written address in any application capable of identifying the format of the address, could be indicated by different colours. The skilled person will appreciate that there are a number of different applications that could utilize the solution according to the invention. Basically, when the application notices an address for an electronic document, it calls the method of this invention in order to have the validity check for the address.

The information on whether the web page for the address or for the portion of the address is found, is indicated to the user. One example of an indication method, and the one which is described in the following, is to change visualisation of the address field e.g. by changing colours to correspond the validity of the address. For example, it can be defined that a red colour refers to an invalid address and a green colour to a valid address. Therefore, when the address field is coloured red; the user knows that the address is either invalid, or the web page referred by it, is removed. When the user starts correcting the characters and proceeds towards the beginning of the character string, at one point the colour may change to green, if the corresponding page can be found. Therefore, the user is informed as to which part of the character string is valid, and from which part the typing should be started again. In the previous, it is assumed that the user types the character string to the browser. However, it is as likely to have other input methods for transmitting data on the character string to the browser. For example, one can select a link pointing to a desired web page or use a virtual keypad, which is used for selecting desired characters. Or in sophisticated solutions one can use speech recognition methods, or methods recognizing handwriting, which—after being transformed into character string—are used similarly for searching the web page. However, it should be noticed that some of these methods do not necessarily enable searching during receiving the character string. For example, when a link is selected, characters of the address pointed by it, are shown all at once. But also in these situations the web page relating to the character string may be searched before transmitting the character string to the server.

FIGS. 1a-i illustrate various ways to indicate the validity of the address. The address, i.e. character string for the desired web page is input to an address field 105. In FIG. 1a the address field is still blank and is visualised normally. If no text has been entered to the address field 105 or searching has not yet been started, the address field will have normal colouring.

FIG. 1b illustrates a situation, where the user wishes to open a web page from an address "www.nokia.com", but has incorrectly typed a character string "www.nokkia.com". Before loading the content from www.nokkia.com (or an error page), the character string is used for searching the web page. The searching may be implemented as a background functionality, which means that it is invisible to the user. Therefore the user need not to do any additional actions for the search. In this example it is assumed that "www.nokkia.com" does not refer to any actual content page, and therefore either the search engine or the browser will—after the search—know that such a web page does not exist. The address field 105 may comprise a control element, by means of which the web page is actually requested by the user. The control element can be used as an indicator for the validity of the character string. If only the control element is used as the indicator (other possibilities will be described later) for the validity of the character string, it is advantageous for devices having e.g. small displays and/or slow connections. In this example the control element is a "GO" button, the colour of which is changed according to the validity of the character string. Therefore, if it has been discovered that the character string does not relate to any web page, the colour of the "GO" button 102 in the address field 105 is changed (e.g. into red) in order to indicate that the character string is not valid as an address. When the user corrects the address to "www.nokia.com" as illustrated in FIG. 1c, the browser is capable of finding the desired web page and the "GO" button 102 changes the colour to e.g. green. At this point, it should be understood that the colours presented in these examples are only examples, and therefore they can be selected to be any other colours as well. In addition, the usage of the colours in this context is only an example. It will be appreciated that the appearance of the control element can be changed from one form to another, from one size to another, or between any combination of those. It would also be possible enable the control element and/or make the control element visible when character string is valid and prevent downloading a document and/or make the control element invisible when the character string is invalid. It will be appreciated that other visualisation means can be used as well, and also such indication methods that do not necessarily relate to visualisation but to other interaction solutions, e.g. voice feedback or force feedback.

In FIG. 1d a similar attempt to that in FIG. 1b to reach "www.nokkia.com" is done. However, in this example in addition to the colouring of "GO" button, the background colour of the address field 105 is arranged to indicate the validity of the address. It will be clear that the indication by the address field 105 can also be used instead of the "GO" button. Above it has been described that the browser is in contact to the search system, but it is also possible that the address field is an active address field, which means that the address field communicates with the search system. This kind of an address field can be common to different browsers, e.g. a plugin, which can be loaded for different applications. The properties of the address field may be defined by the user, e.g. which search engines or search systems the address field is supposed to use. In the FIG. 1d, the web page for "www.nokkia.com" is searched unsuccessfully. As a result of that, the background colour is changed, and turned into red, if red is the colour indicating invalidity. Due to the indication, the user notices the problem before he/she would have started loading the web page. Therefore, in FIG. 1e the user corrects the address to "www.nokia.com" and the change of the background colour in the address field 105 indicates of the successful finding of web page. In both FIG. 1d, 1e, the colour of the icon 102 can be changed as well.

FIG. 1f illustrates a situation where the domain part ("www.nokia.com") of the address is found from the internet, but the detailed part ("phon") is not, because the detailed part is not yet completed or the detailed part is mistyped. In this example the colouring for the beginning is set according to its validity, e.g. to colour green. In addition, the indication for the detailed part is set after the detailed part has been finalized and after the search for it has been done. FIG. 1g presents the result, when the detailed part (/phones/) has been completed, due to which the background colour for also to the detailed part can be set. In the example of FIG. 1g, the detailed part is coloured with the same colour as the domain part, because a web page for the address "www.nokia.com/phones" can be found from the internet. If the detailed part was invalid, as it is in the FIG. 1h, it is also possible to colour that part ("phon") of the address field into colour indicating invalidity, even though the valid part was coloured differently. Therefore the address field 105 may have a background with two colours. In the FIG. 1h it is also possible to let the user to select the "GO" button, even though only a part of the character string is valid. As a result of the selection, the web page corresponding the valid part of the character string is requested and loaded to the browser. FIG. 1i illustrates the address field 105 indicating the whole character string by the colour representing the invalidity, even though the least specific part (i.e. domain part) is correct.

For the current solution, it is possible to define the amount of characters after which the searching will be started. For example it can be defined that the checking should start after three letters, e.g. letters following "www." are received, or after first dot, or after nine characters. The skilled person will appreciate the numerous other possibilities for the conditions of the checking.

In the previous examples it can be determined if and when the user has entered the last character of the character string, which means that the address for a web page is then fully defined. The determination can occur for example due to a pause of predetermined length in entering the characters.

The previous examples concentrate on visual and particularly to colour indication. It will be, however, appreciated by the skilled person that other indications can be used as well. For example a sound during the typing may indicate invalid address. In addition, the previous examples were aimed to a situation, where the user types the address by him/herself. However, as said earlier, entering the address manually is not always the only way to the web page. Web sites comprising links to another sites provide a quick transfer from one place to another. However, it is also possible that a wrong address has been appointed to the link in question, or the web page being targeted by the link is removed. It is obvious that it would be highly useful to see the validity of the link without opening the link. The current invention can be applied to that situation also. For example, when a mouse cursor or other pointer is rolled over a link, the address relating to that link can be seen e.g. in the browser window. Similarly also this address can be used for determining its validity by means of the current invention. Further as an alternative, it is possible to scan through all or some of the links occurring in a web page, and place e.g. a colour indication to them depending on their validity. Due to this, the user need not to select anything from the web page, but can only view, which links are valid and which are not.

Figure 2:
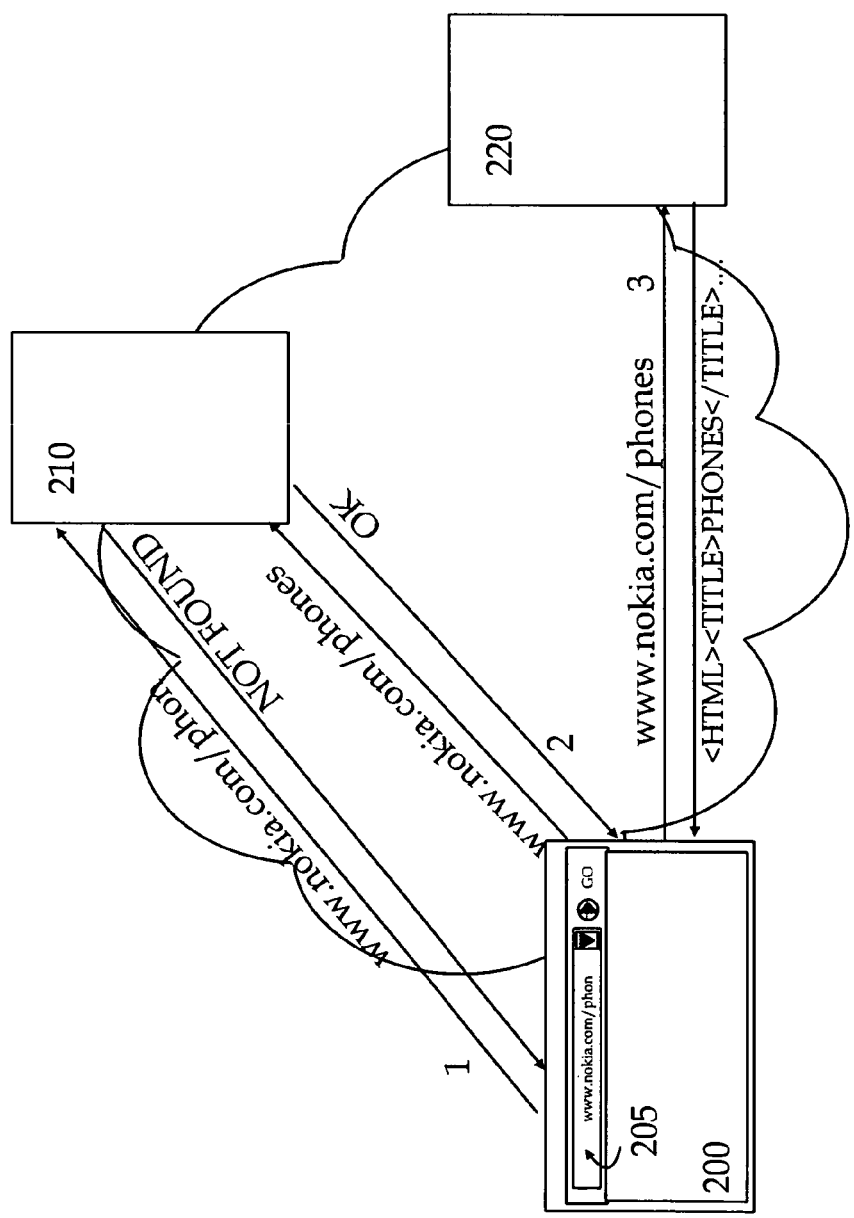
FIG. 2 illustrates a simplified example of a system according to the invention.

FIG. 2 illustrates a simplified example of the system according to the invention. In this example an address for a web page is received in an address field 205 in a browser 200. The browser 200 is arranged to make a search for the address while the user is typing the address. In this example the search is carried out by means of a search engine 210 for which the typed address is transmitted (1). The search engine 210 looks for a web page that corresponds to the address and if the address is invalid (i.e. it does not refer to any web pages), the search engine 210 returns information of the situation. Due to this information the browser 200 is arranged to form an indication to the user e.g. by means of changed visualisation. The content of address field 205 is transmitted to the search engine 210 repeatedly, and the search engine 210 replies according to the validity. The skilled person will appreciate that the content of the address field can be constantly transmitted to the search engine e.g. at intervals of specific amount of characters, after a specific character, at intervals of specific time, etc. When a valid address is found, the search engine returns OK message. As a response to the received OK message, the browser provides another indication of the successful search to the address field 205. At this point, the user may proceed to the web page, which is identified by the valid address or specify the address further. If the user selects to proceed, a request containing the address is transmitted (3) to a server 220 storing the web page. The server 220 operates in a traditional manner and returns the corresponding web page to the browser 200.

An example of the method steps is illustrated in FIG. 3. At first (300) characters are received to the address field. After possible predetermined conditions (e.g. amount of the characters, specific characters) for the search are met (305), the search is carried out (310) for a document identifier that corresponds to the received characters. If the document identifier is not found (320), the address field is set (325) into colour red. If the document identifier is found (320), the address field is set (330) into colour green. After that it is determined, whether a control element is selected (340). If the control element was not selected, the receiving of characters will continue. If the control element was selected, a document defined by the document identifier is requested (350). After receiving the desired document, the document is illustrated in a display (360). It will be appreciated that the steps described here should not be considered limitations for the current invention, because—for example—if the document identifier is not found by the character string, the change can be targeted to some other elements in the browser or in a different way to the address field.

The invention can be applied in an electronic device, such as a personal computer, a laptop, a PDA device, a mobile communication device, a television, etc. One example of the device is illustrated in FIG. 4. The device comprises communication means 420 having a transmitter 421 and a receiver 422 or is connected to such. There can also be other communicating means 480 having a transmitter 481 and a receiver 482 as well. The first communicating means 420 can be adapted for telecommunication and the other communicating means 480 can be a kind of short-range communicating means, such as a Bluetooth™ system, a WLAN system (Wireless Local Area Network) or other system which suits local use and for communicating with another device. The device 400 according to the example in FIG. 4 also comprises a display 440 for displaying visual information and a user interface for the browser. Further the device 400 may comprise an interaction means, such as a keypad 450 for inputting data etc. In addition or instead of the keypad 450, the device can comprises stylus, when the display is a touch-screen display. The device 400 can comprise audio means 460, such as an earphone 461 and a microphone 462 and optionally a codec for coding (and decoding, if needed) the audio information. The device 400 can further comprise imaging means 410. A control unit 430 may be incorporated to the device 400 for controlling functions and running applications in the device 400. The control unit 430 may comprise one or more processors (CPU, DSP). Further the device comprises memory 470 for storing e.g. data, applications, and computer program code.

The previous description presents a solution by means of which the user can see, whether the wanted address is valid or not. If the address is typed by him or her, the validity can be checked throughout the typing process. The elements presented in relation to the system are examples, and one skilled in the art will appreciate that other databases and systems may suitably communicate with the present system in order to provide enhanced functionality. Therefore it will be clear that variations and modifications of the previous examples are possible without departing from the scope of protection of the invention as set forth in the claims.

What is claimed is:

1. A method comprising:
receiving, via an active address field, a character string comprising one or more characters,
repeatedly checking validity by repeatedly requesting information on the validity of said character string as a document identifier, wherein the checking is implemented by the active address field receiving the character string,
causing indication of a valid part of said character string comprising at least a domain part,
causing indication of the validity of said character string as a whole by causing an appearance of a control element to change, wherein the control element is configured to cause a request for a document relating to the document identifier defined by said character string to be sent in response to selection of the control element by a user and wherein the control element does not include an indication of the document identifier defined by said character string; and
causing an offering of a possibility to send a request for a document relating to the document identifier defined at least by the valid part of the character string and ignoring any other part of said character string.

2. The method according to claim 1, wherein causing the appearance of the control element to change comprises causing the control element to change from a first color to a second color.

3. The method according to claim 1, wherein checking the validity of said character string is carried out before a request for a document is sent.

4. The method according to claim 1, wherein the checking is performed by a search engine.

5. The method according to claim 1, wherein the document identifier is a web address.

6. The method according to claim 1, wherein the character string is input character by character, whereby the checking is carried out during input.

7. The method according to claim 1, wherein a search enquiry is carried out for a portion of the character string.

8. The method according to claim 7, wherein conditions for the search are modified by the user.

9. The method according to claim 1, wherein valid and invalid portions of the character string are indicated in the character string.

10. The method according to claim 1, wherein several search systems are used by the active address field.

11. The method of claim 1, wherein if said any other part of said character string comprises an invalid part, then said valid part of the character string corresponds to a web page that is offered to the user.

12. A system comprising:
a server; and
an apparatus comprising at least one processor and at least one memory including computer program code, the at least one memory and the computer program code configured to, with the at least one processor, cause the apparatus at least to:
receive, via an active address field, a character string, said character string comprising one or more characters,
cause repeated checking of validity by repeatedly requesting information on the validity of said character string as a document identifier wherein the checking is implemented by the active address field receiving the character string,
cause indication of a valid part of said character string comprising at least a domain part,
cause indication of the validity of said character string as a whole by changing an appearance of a control element, wherein the control element is configured to cause a request for a document relating to the document identifier defined by said character string to be sent in response to selection of the control element by a user and wherein the control element does not include an indication of the document identifier defined by said character string; and
cause an offering of a possibility to send a request for a document relating to the document identifier defined at least by the valid part of the character string and ignore any other part of said character string.

13. An apparatus comprising at least one processor and at least one memory including computer program code, the at least one memory and the computer program code configured to, with the at least one processor, direct the apparatus at least to:

receive, via an active address field, a character string comprising one or more characters, cause repeated checking of validity by repeatedly requesting information on the validity of said character string as a document identifier wherein the checking is implemented by the active address field receiving the character string, cause indication of a valid part of said character string comprising at least a domain part, cause indication of the validity of said character string as a whole by changing an appearance of a control element, wherein the control element is configured to cause a request for a document relating to the document identifier defined by said character string to be sent in response to selection of the control element by a user and wherein the control element does not include an indication of the document identifier defined by said character string; and cause an offering of a possibility to send a request for a document relating to the document identifier defined at least by the valid part of the character string and ignore any other part of said character string.

14. The apparatus according to claim 13, wherein the apparatus is directed to cause establishment a communication channel to an external device, for receiving information on the validity of the character string.

15. The apparatus according to claim 13, wherein the apparatus is directed to cause indication of the validity of said character string as a document identifier by changing the appearance of the control element.

16. The apparatus according to claim 13, wherein the apparatus is directed to check the validity of said character string before a request for information on the validity is sent.

17. The apparatus according to claim 13, wherein the apparatus is further directed to implement a browser having an address field for receiving the character string.

18. The apparatus according to claim 13, wherein the document identifier is a web address.

19. The apparatus according to claim 13, wherein the apparatus is directed to cause indication of the valid and invalid portions of the character string.

20. A non-transitory computer-readable medium encoded with instructions that, when executed by a processor, cause the processor to perform:

receiving, via an active address field, a character string comprising one or more characters, repeatedly checking validity by repeatedly requesting information on the validity of said character string as a document identifier wherein the checking is implemented by the active address field receiving the character string, causing indication of a valid part of said character string comprising at least a domain part, causing indication of the validity of said character string as a whole by changing an appearance of a control element, wherein the control element is configured to cause a request for a document relating to the document identifier defined by said character string to be sent in response to selection of the control element by a user and wherein the control element does not include an indication of the document identifier defined by said character string; and causing an offering of a possibility to send a request for a document relating to the document identifier defined at least by the valid part of the character string and ignoring any other part of said character string.

21. The non-transitory computer-readable medium according to claim 20, wherein the checking is performed by a search engine.

22. An apparatus comprising:

means for receiving, via an active address field, a character string comprising one or more characters, means for causing repeated checking of validity by repeated requesting information on the validity of said character string as a document identifier wherein the checking is implemented by the active address field receiving the character string, means for causing indication of a valid part of said character string comprising at least a domain part, means for causing indication of the validity of said character string as a whole by changing an appearance of a control element, wherein the control element is configured to cause a request for a document relating to the document identifier defined by said character string to be sent in response to selection of the control element by a user and wherein the control element does not include an indication of the document identifier defined by said character string, and means for causing an offering of a possibility to send a request for a document relating to the document identifier defined at least by the valid part of the character string and ignoring any other part of said character string.

\* \* \* \* \*